United States Patent
McGuire et al.

(10) Patent No.: US 7,107,497 B2
(45) Date of Patent: Sep. 12, 2006

(54) METHOD AND SYSTEM FOR EVENT PUBLICATION AND SUBSCRIPTION WITH AN EVENT CHANNEL FROM USER LEVEL AND KERNEL LEVEL

(75) Inventors: Cynthia A. McGuire, San Jose, CA (US); Hans-Josef Hoffman, Delbrueck (DE); Frank Mueller, Paderborn (DE)

(73) Assignee: Sun Microsystems, Inc., Santa Clara, CA (US)

(*) Notice: Subject to any disclaimer, the term of this patent is extended or adjusted under 35 U.S.C. 154(b) by 436 days.

(21) Appl. No.: 10/448,887

(22) Filed: May 30, 2003

(65) Prior Publication Data

US 2004/0153998 A1    Aug. 5, 2004

Related U.S. Application Data

(63) Continuation-in-part of application No. 10/262,294, filed on Sep. 30, 2002.

(51) Int. Cl.
*G06F 11/00*    (2006.01)

(52) U.S. Cl. ............... 714/48; 714/57; 719/318

(58) Field of Classification Search ............ None
See application file for complete search history.

(56) References Cited

U.S. PATENT DOCUMENTS

| | | | |
|---|---|---|---|
| 5,483,637 A * | 1/1996 | Winokur et al. | 714/26 |
| 6,314,533 B1 * | 11/2001 | Novik et al. | 714/39 |
| 6,598,169 B1 * | 7/2003 | Warwick et al. | 713/320 |
| 6,785,893 B1 * | 8/2004 | Morris et al. | 719/318 |
| 6,889,244 B1 * | 5/2005 | Gaither et al. | 709/202 |
| 6,944,662 B1 * | 9/2005 | Devine et al. | 709/225 |
| 7,006,603 B1 * | 2/2006 | Boetje et al. | 379/9.03 |
| 7,028,229 B1 * | 4/2006 | McGuire et al. | 714/57 |
| 2002/0188766 A1 * | 12/2002 | Vuppula | 709/318 |
| 2004/0172342 A1 * | 9/2004 | Gross | 705/27 |
| 2004/0177319 A1 * | 9/2004 | Horn | 715/501.1 |
| 2005/0091287 A1 * | 4/2005 | Sedlar | 707/200 |
| 2006/0070083 A1 * | 3/2006 | Brunswig et al. | 719/318 |

* cited by examiner

*Primary Examiner*—Scott Baderman
*Assistant Examiner*—Joshua Lohn
(74) *Attorney, Agent, or Firm*—Martine Penilla & Gencarella, LLP

(57) ABSTRACT

A method and system for event publication and subscription with an event channel from user level and kernel level are disclosed. The system comprises an event channel. The event channel includes an event queue for an event sent by a publisher. Additionally, the event channel has a plurality of subscriber-based queues each corresponding to a subscriber. If the corresponding subscriber has subscribed to receive delivery of the event, the subscriber-based queue includes the event. Moreover, the event channel further comprises a dispatcher for dispatching based on filtering criteria the event to the subscriber-based queue if the corresponding subscriber has subscribed to receive delivery of the event, and a delivery mechanism for delivering the event from the subscriber-based queue to the corresponding subscriber. The publisher can be a user level publisher or a kernel level publisher. The subscriber can be a user level subscriber or a kernel level subscriber.

24 Claims, 10 Drawing Sheets

METHOD AND SYSTEM FOR EVENT PUBLICATION AND SUBSCRIPTION WITH AN EVENT CHANNEL FROM USER LEVEL AND KERNEL LEVEL

CROSS REFERENCE TO RELATED APPLICATION

This patent application is a Continuation-in-Part of co-pending U.S. patent application Ser. No. 10/262,294, filed on Sep. 30, 2002, entitled "KERNEL EVENT PUBLICATION AND SUBSCRIPTION SYSTEM AND METHOD", by McGuire et al., which is incorporated herein by reference.

BACKGROUND OF THE INVENTION

1. Field of the Invention

The present claimed invention relates generally to the field of computer systems and computer operating systems. More particularly, embodiments of the present claimed invention relate to subscribing and to publishing events with an event channel from the user level and kernel level.

2. Related Art

A computer system can be generally divided into four components: the hardware, the operating system, the application programs and the users. The hardware (e.g., central processing unit (CPU), memory and input/output (I/O) devices) provide the basic computing resources. The application programs (e.g., database systems, games business programs (database systems, etc.) define the ways in which these resources are used to solve computing problems. The operating system controls and coordinates the use of the hardware resources among the various application programs for the various users. In doing so, one goal of the operating system is to make the computer system convenient to use. A secondary goal is to use the hardware in an efficient manner.

The Unix operating system is one example of an operating system that is currently used by many enterprise computer systems. Unix was designed to be a time-sharing system, with a hierarchical file system, which supported multiple processes. A process is the execution of a program and consists of a pattern of bytes that the CPU interprets as machine instructions (text), data and stack. A stack defines a set of hardware registers or a reserved amount of main memory that is used for arithmetic calculations.

The Unix operating system consists of two separable parts: the "kernel" and the "system programs." Systems programs consist of system libraries, compilers, interpreters, shells and other such programs that provide useful functions to the user. The kernel is the central controlling program that provides basic system facilities. The Unix kernel creates and manages processes, provides functions to access file-systems, and supplies communications facilities.

The Unix kernel is the only part of Unix that a user cannot replace. The kernel also provides the file system, CPU scheduling, memory management and other operating-system functions by responding to "system-calls." Conceptually, the kernel is situated between the hardware and the users. System calls are used by the programmer to communicate with the kernel to extract computer resource information. The robustness of the Unix kernel allows system hardware and software to be dynamically configured to the operating system while applications programs are actively functional without having to shut-down the underlying computer system.

Thus, when system hardware or software resource changes are implemented in a computer system having the Unix operating system, the kernel is typically configured or reconfigured to recognize the changes. These changes are then made available to user applications in the computer system. Furthermore, as system errors and faults occur in the underlying operating system, the kernel is able to identify these errors and faults and make them available to applications that these error and faults may affect. Applications typically make system calls by way of "system traps" to specific locations in the computer hardware (sometimes called an "interrupt" location or vector) to collect information on these system errors. Specific parameters are passed to the kernel on the stack and the kernel returns with a code in specific registers indicating whether the action required by the system call was successfully completed or not.

FIG. 1 is a block diagram illustration of an exemplary prior art computer system 100. The computer system 100 is connected to an external storage device 180 and to an external drive device 120 through which computer programs can be loaded into computer system 100. The external storage device 180 and external drive 120 are connected to the computer system 100 through respective bus lines. The computer system 100 further includes main memory 130 and processor 110. The drive 120 can be a computer program product reader such a floppy disk drive, an optical scanner, a CD-ROM device, etc.

FIG. 1 additionally shows memory 130 including a kernel level memory 140. Memory 130 can be virtual memory which is mapped onto physical memory including RAM or a hard drive, for example. During process execution, a programmer programs data structures in the memory at the kernel level memory 140. User applications 160A and 160B are coupled to the computer system 100 to utilize the kernel memory 140 and other system resources in the computer system 100. In the computer system 100 shown in FIG. 1, when kernel events occur, each of the applications 160A and 160B have to independently perform poll or query operations to become aware of these events. Furthermore, each application has to initiate system calls to the kernel 140 to extract information on a particular event.

This typically results in the applications blocking or waiting for the kernel 140 to extract event information. Having the applications 160A and 160B independently issue system calls to the kernel to extract kernel event information further requires the applications to always preempt the kernel to extract event information. This can be inefficient, time consuming and costly. It may also require the applications to terminate or suspend other processes while preempting the kernel to extract kernel event information.

SUMMARY OF THE INVENTION

A method and system for event publication and subscription with an event channel from user level and kernel level are disclosed. The system comprises an event channel. The event channel includes an event queue for an event sent by a publisher. Additionally, the event channel has a plurality of subscriber-based queues each corresponding to a subscriber. If the corresponding subscriber has subscribed to receive delivery of the event, the subscriber-based queue includes the event. Moreover, the event channel further comprises a dispatcher for dispatching based on filtering criteria the event to the subscriber-based queue if the corresponding subscriber has subscribed to receive delivery of the event, and a delivery mechanism for delivering the event from the subscriber-based queue to the corresponding subscriber. The publisher can be a user level publisher or a kernel level publisher. The subscriber can be a user level subscriber or a kernel level subscriber.

These and other objects and advantages of the present invention will no doubt become apparent to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
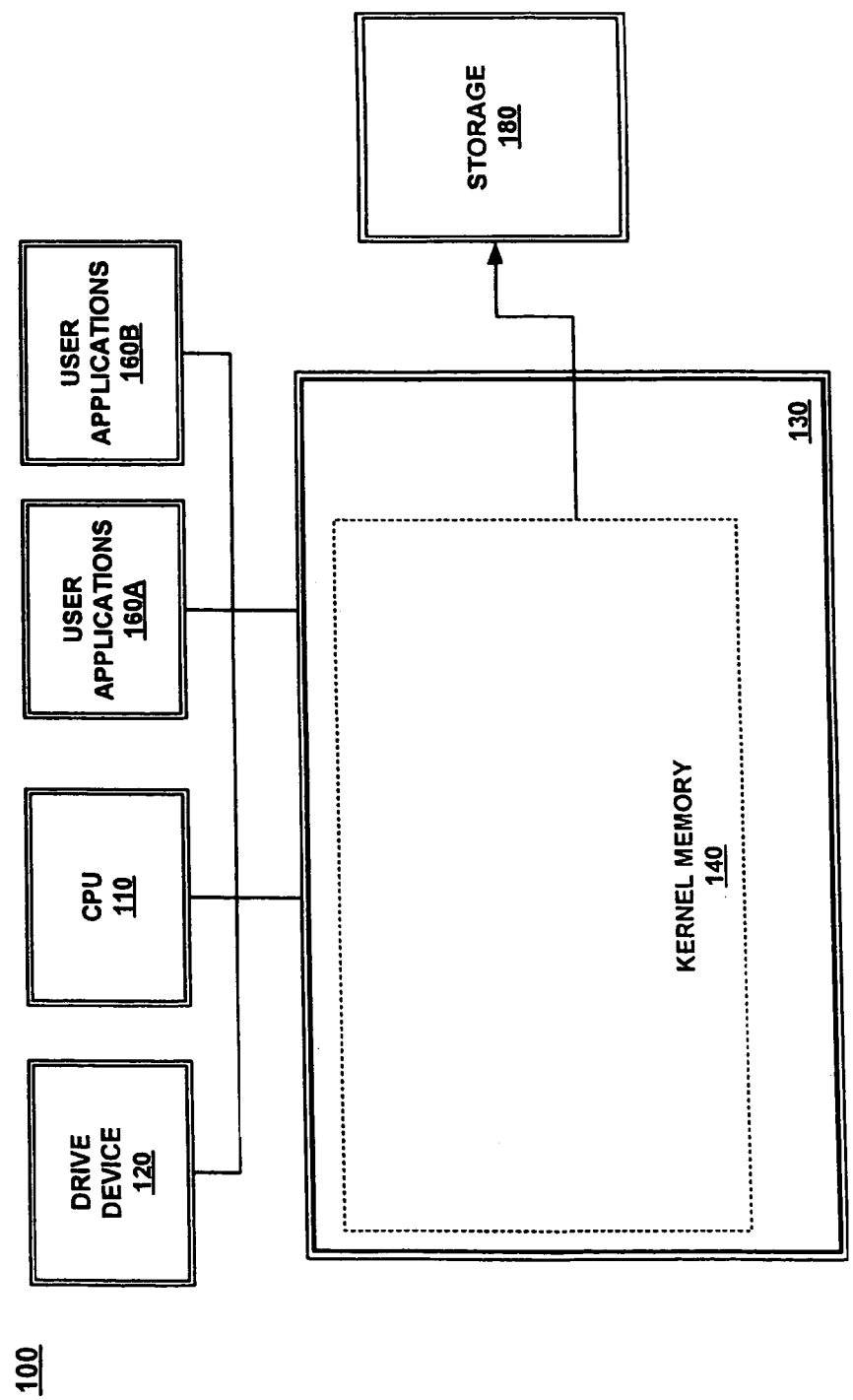
FIG. 1 is a block diagram of a prior art computer system.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail as not to unnecessarily obscure aspects of the present invention.

Accordingly, to take advantage of the many legacy application programs available and the increasing number of new applications being developed, a system is needed that allows a programmer to add extensions to a kernel to publish the occurrence of kernel level events to user level applications data without disrupting the functionality of the kernel for other operations. Further, a need exists to use existing legacy programs without having to recompile the underlying kernel in the operating system each time a new event is published from the kernel. A need further exists for an improved and less costly program independent of the operating system, which improves efficiency, reliability and provides a means to compile programs without losing the embedded features designed in these programs. A need further exists to reliably publish kernel level events and user level events to application programs and transparently filter events for other programs that have no need for these events.

What is described herein is a computer system having a kernel structure that provides a technique for monitoring and publishing kernel level events to user level applications by an asynchronous notification mechanism without having to recompile the kernel modules that publish the events. Embodiments of the present invention allow programmers to add system level loadable modules to existing kernel modules and provide a mechanism to extract and publish events to the user level applications without having user applications clogging the kernel with event query or poll requests. Embodiments of the present invention allow a system event framework in the kernel to publish the occurrences of hardware and software changes to specific user applications in a computer system. These kernel events may also include kernel errors and faults. Events detected by the kernel system event framework are asynchronously published to the user applications as they occur to avoid interruption of other operations of these applications.

The system event framework further provides users with a number of semantics that allow user level applications to subscribe to specific events in the kernel. The system event framework of the present invention further allows the non-interfering additions to a single entity without the need for pre-existing code to change.

Embodiments of the present invention further include kernel event publication logic that identifies kernel level events based on categories submitted by kernel subsystems and publishes these events as they occur to the specific applications. In one embodiment of the present invention, the kernel event publisher allows users to dynamically add to existing event characteristics based on unique identifiers to each event that an application wishes to subscribe.

Embodiments of the present invention also include event data system queues that dynamically queue the kernel events being monitored as they occur. The system event queues enable the kernel to buffer the system event data prior to dispatching the data to user level applications. The event data comprises a class and sub-class definition of the event. The event data also includes identification information that uniquely identifies each event for a particular application.

Embodiments of the present invention further include event data loadable modules that are implemented as intermediaries between the user applications subscribing to the kernel events and the kernel. The system event loadable modules receive all events published by the kernel and asynchronously distribute the events to the applications based on the class and unique identifier information. The system event loadable modules may be dynamically added to the system event framework dispatching daemon of the present invention without the need to recompile the underlying framework or event consumers or producers. The system event loadable modules also include acknowledgement logic that is triggered by each application when an event is received by the application to indicate receipt of the event. This allows the kernel to flush the system event queue of pending events after the events have been delivered. Further, system event loadable modules allow new features to be added to the base framework without recompilation of framework entities, a reboot of the operating system or restarting the system event daemon.

Embodiments of the present invention further include a system event daemon that accepts delivery of the kernel events and dispatches the events to the appropriate system event loadable module. The system event daemon monitors the system event loadable modules to ensure that events queued by the kernel are delivered to the appropriate applications. The system daemon further ensures that when event delivery is completed to the applications, the kernel is notified to flush the kernel event queues.

Embodiments of the present invention further include event subscription logic that allows user applications to subscribe to certain kernel events. The kernel event subscription logic is based on the event class and sub-class types. The event subscription logic establishes a connection between the system event daemon and the user application to create a connection path to deliver kernel event data to the applications. The event subscription logic also manages subscribers on behalf of the system event daemon and filters the kernel event buffers for each event subscriber in order to free kernel entries.

Embodiments of the present invention further include a system event configuration file registration feature that provides event information that is used by the present invention to determine when an application or script should be launched or invoked in response to a specific event. The system event configuration file feature is implemented as a loadable module to the system event framework daemon. As such, changes to the configuration file features may be made independent of the daemon and the base system event framework.

Embodiments of the present invention further include a device driver interface module that enables the addition of device drivers to enable individual user applications to independently publish a kernel level events. The device driver interface module further minimizes the number of interfaces a driver must use to log a system event.

The embodiments of the invention are directed to a system, an architecture, subsystem and method to monitor kernel level events and to publish the occurrence of those events to subscribing user level applications. In accordance with an aspect of the invention, a kernel level event data monitoring system provides user applications the ability to dynamically receive notification of kernel events as they occur for particular applications transparently to the underlying operating system and the other applications running in the computer system.

Figure 2:
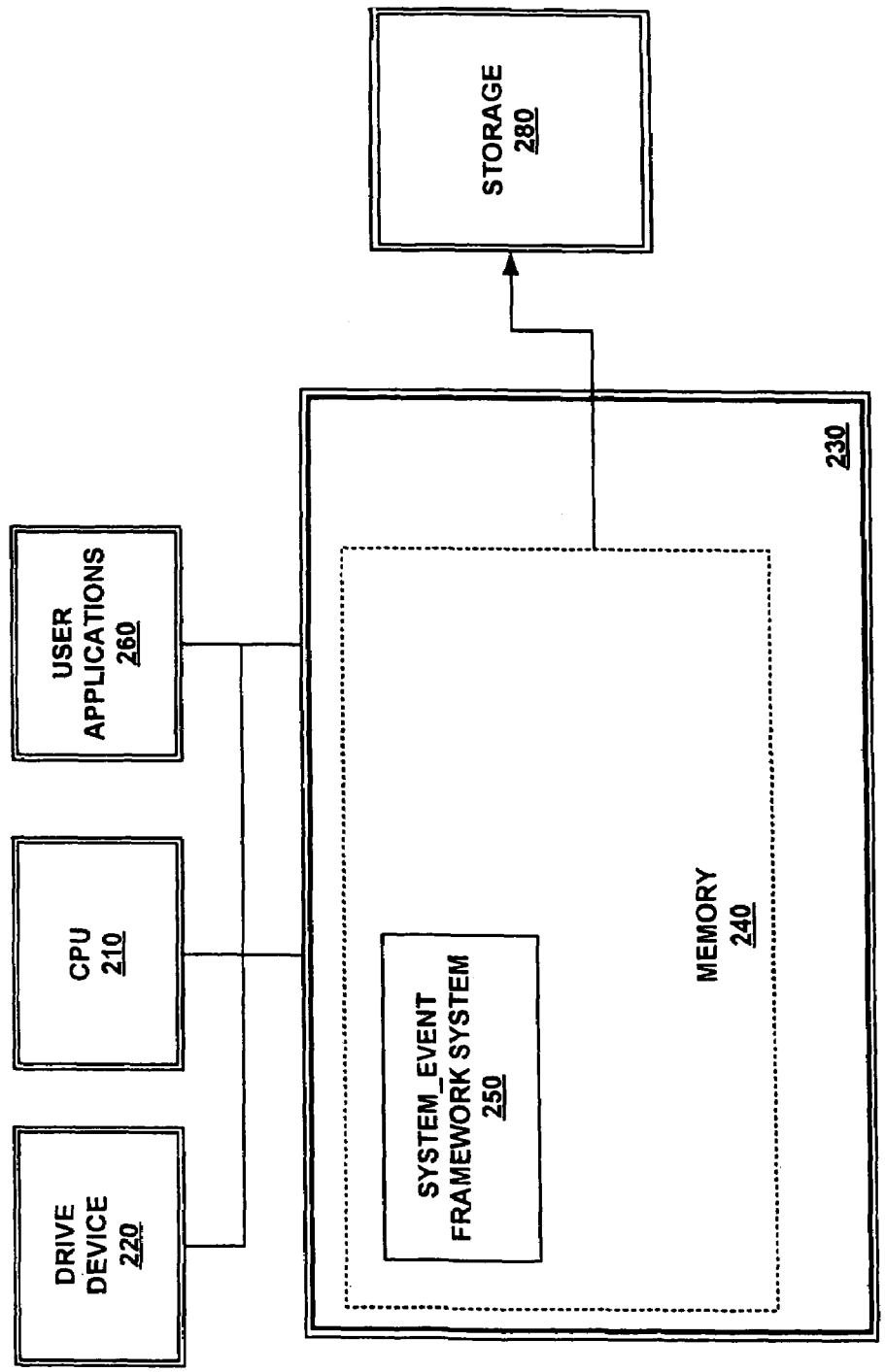
FIG. 2 is a block diagram of a computer system in accordance with an embodiment of the present invention.

FIG. 2 is a block diagram illustration of one embodiment of a computer system 200 of the present invention. The computer system 200 according to the present invention is connected to an external storage device 280 and to an external drive device 220 through which computer programs according to the present invention can be loaded into computer system 200. External storage device 280 and external drive 220 are connected to the computer system 200 through respective bus lines. Computer system 200 further includes main memory 230 and processor 210. Drive 220 can be a computer program product reader such a floppy disk drive, an optical scanner, a CD-ROM device, etc.

FIG. 2 shows memory 230 including a kernel level memory 240. Memory 230 can be virtual memory which is mapped onto physical memory including RAM or a hard drive, for example, without limitation. During process execution, a programmer programs data structures in the memory at the kernel level memory 240. According an embodiment of the present invention, the kernel memory level includes a kernel level system event framework system (KLFS) 250. The KLFS 250 enables a programmer to subscribe to and monitor kernel level events for particular user level applications 260 that the programmer is implementing and the KLFS 250 dynamically notifies the intended applications 260 of the occurrence of such events. The notification of the subscribed events as they occur are non-interfering to other applications that may be running on the user's computer system.

The KLSF 250 comprises application interfaces for kernel level publication and applications interfaces for user level notification of events occurring in the kernel 240. The KLFS 250 provides a standardized event buffer and payload (e.g., data) that is delivered to the subscribing user applications. The KLFS 250 further comprises libraries to extract event data from the event buffers and a daemon that dispatches the events to the user level applications.

Figure 3:
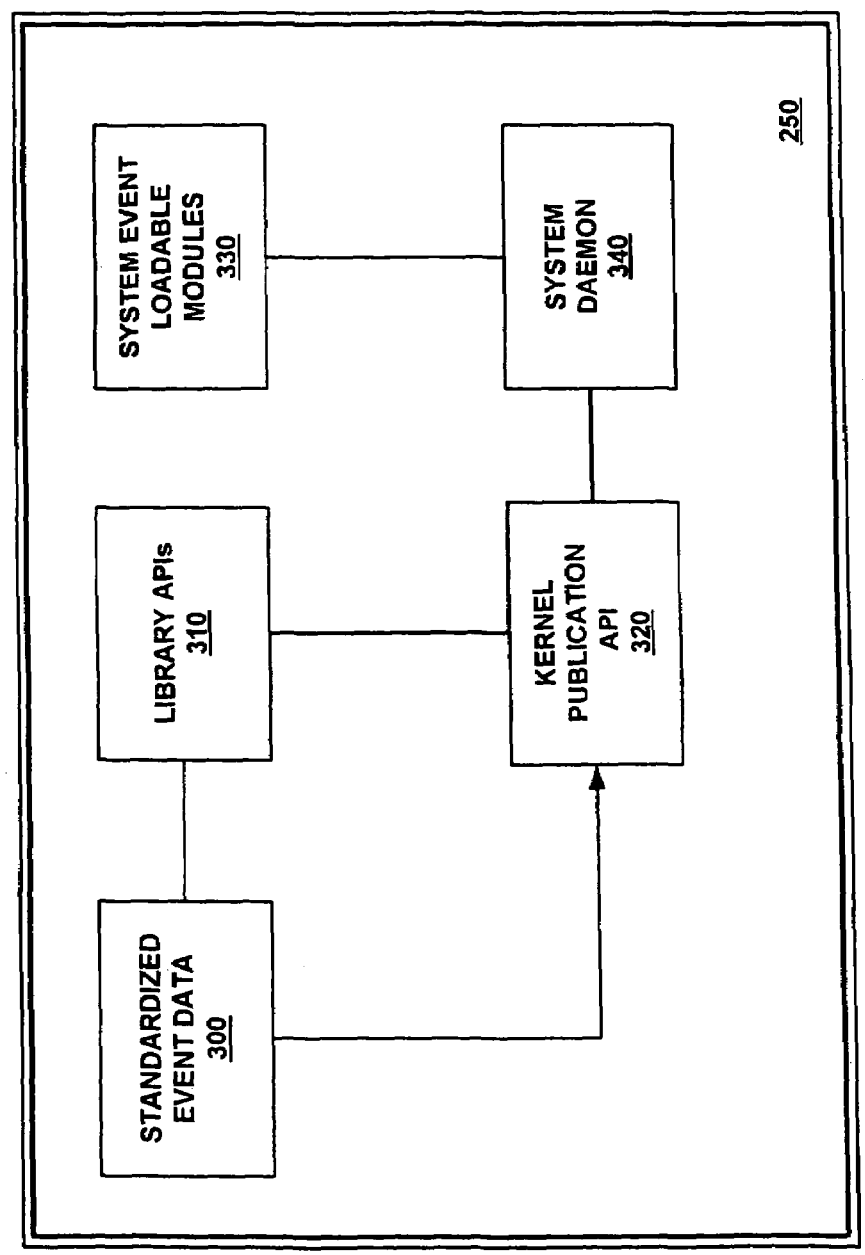
FIG. 3 is a block diagram of an embodiment of the kernel event monitoring framework system of the present invention.

FIG. 3 is a block diagram illustration of one embodiment of the kernel level system event monitoring framework system (KLFS) 250 of the present invention. The KLFS 250 comprises standardized event data module 300, application interface (API) library module 310, kernel publication module 320, system event loadable (SLM) module 330 and system daemon module 340.

The standardized event data module 300 provides event handles to particular system event objects. The system event types may include a class of related event conditions or a subclass of particular conditions with a class. The event data module also provides a set of unique event identifiers that provides high resolution timestamp and sequencing numbers to uniquely identify events as they occur in the kernel 240.

The event data module 300 further provides a set of publisher identifiers that uniquely identifies each kernel event subscriber. The publisher identifiers differentiate the same event type generated from different sources or publishers. In one embodiment of the present invention, the event data module 300 further generates a set of unique data attributes that comprise a set of name-value pairs that further describe the event conditions as they occur in the kernel 240.

The kernel event publication module 320 publishes the events as they occur in the kernel 240. In one embodiment of the present invention, each event contains a number of buffers with a set of header information. The header information is typically filled in by the KLFM 250, except the class and sub-class information. The event buffer also contains a publisher identifier which allows the KLFS 250 to differentiate the same event from different sources. The kernel event publisher 320 also provides the data payload containing specific data that a specific publisher requires.

The kernel event publication module 320 is preferably a set of routines that serve as the building blocks to the kernel's subsystem specific modules, such as the device driver interface (DDI). The kernel event publication module 320 also allocates memory for each event handle provided along with each subscription request to the KLFS 250. The kernel event publication module 320 further frees memory associated with each event handle, e.g., freeing of header and any attribute data.

In one embodiment of the present invention, the event publication module 320 also adds new attributes (name-value pair) to any system event attribute list that is created by the KLFS 250 by creating the list if the data will be the first attribute element on the list. The event publication module 320 also attaches attribute data to a previously allocated event object and similarly detaches attribute data from event objects.

Still referring to FIG. 3, the system event loadable module (SLM) 330 acts as an intermediary between the user applications programs 260 making event subscriptions and the kernel 240. The SLM 330 receives all events as they occur in the kernel 240 and passes the events on to the requesting applications 260. In one embodiment of the present invention, the kernel level events are buffered and queued for presentation to the SLM 330.

The SLM 330 further provides a mechanism to allow the programmer (user) to add special features to the system event daemon on the user's computer. The SLM 330 primarily acts based on the event type being monitored in the kernel and subscribed by the applications program. Event buffers generated by the kernel 240 are filtered and passed by the SLM 300 to other applications in the computer system 200 as needed.

The SLM 330 also provides the KLFS 250 a level of reliability to deliver kernel events to the subscribing applications. In one embodiment of the present invention, the SLM 330 communicates with the overlying applications 260 in a one-to-one relationship to ensure that events generated for a particular application are not mistakenly delivered to another application. The SLM 330 includes acknowledgement logic that acknowledges receipt of buffered event designated to the SLM 330. The acknowledgement logic enables the KLFS 250 to release buffered events or retry delivery.

The system daemon module 340 typically resides on the user's computer system and communicates to the KLFS 250 via an interface. The system daemon module 340 primarily communicates with the kernel 240 with the SLM 330 acting as clients of the system daemon 340. The system daemon module 340 accepts delivery of system event objects from the kernel 240 and through a dispatching thread temporarily places the buffered events data on each SLM 330 client queue.

Once an event delivery is made to the SLM 330, the buffer is removed based on the acknowledgement receipt sent by the SLM 330 to the system event daemon 340. There are several reasons for the SLM 330 to acknowledge receipt of an event delivery. One is to ensure that the event data buffers are not freed from the kernel 240 until the SLM 330 confirms it has received the event. Another is to allow the SLM 330 to request that delivery be retried if it is not able to process the event data immediately. In one embodiment of the present invention, the system event daemon dispatches the event data in a multi-threaded process to each respective SLM 330.

Figure 4:
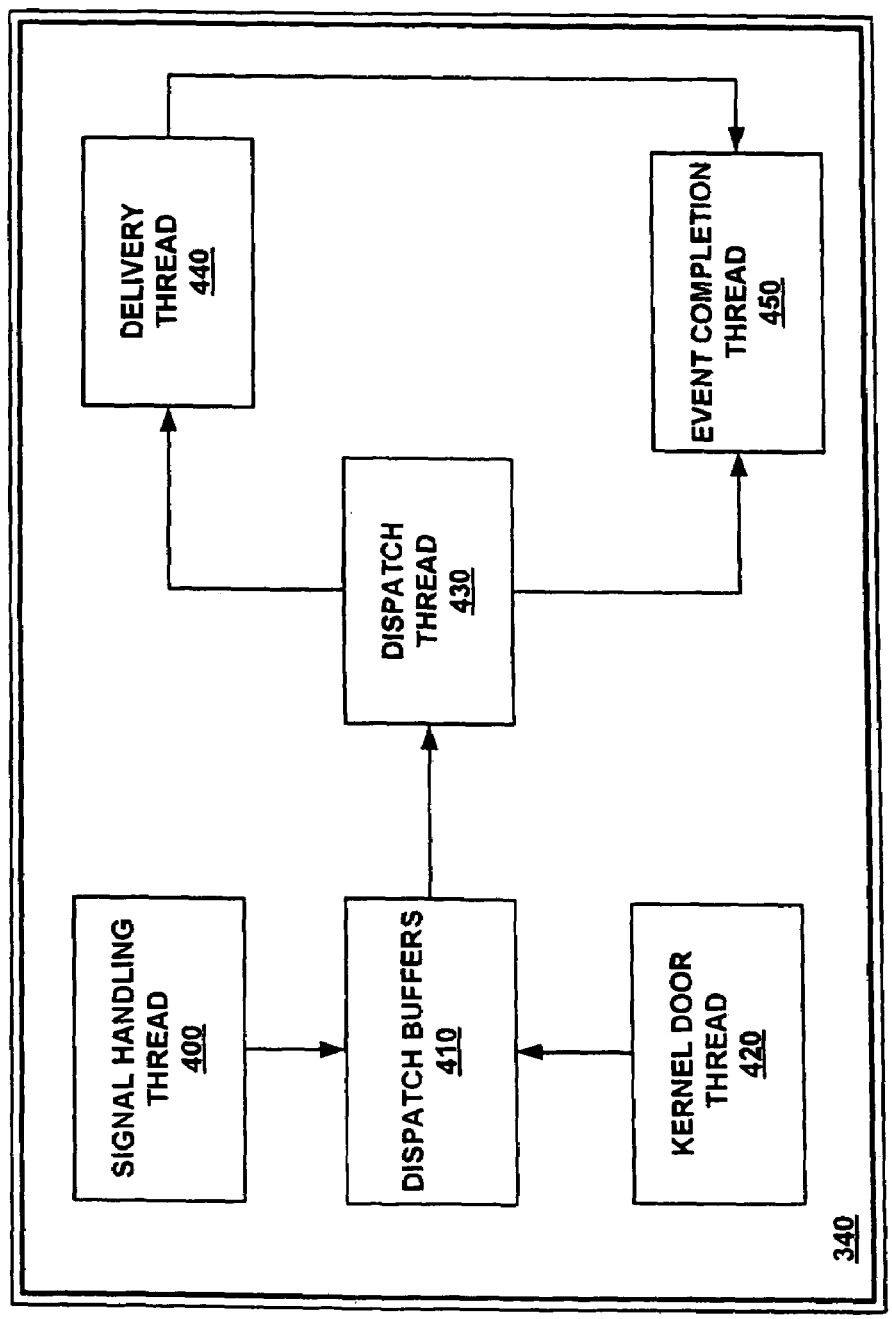
FIG. 4 is a block diagram of one embodiment of an internal architecture of a system event daemon of one embodiment of the kernel event monitoring framework of the present invention.

Reference is now made to FIG. 4 which is a block diagram illustration of one embodiment of the system event daemon 340 of the present invention. As depicted in FIG. 4, the system event daemon 340 comprises signal handling thread module 400, dispatch buffers 410, kernel door server thread 420, dispatch thread 430, delivery thread 440 and event completion thread 450.

The signal handling thread 400 receives signal handles from the applications 260 and coordinates draining of the SLM 330 queue as the data in the queues of the dispatch buffers 410 are delivered to the SLM 330. Upon delivery of the queued buffered data, the signal handling thread 400 sends a completion signal to the kernel 240 to indicate completion of all event data delivery. This causes all outstanding event data deliveries to be flushed from the system event daemon 340. The signal handling thread 400 then revokes the kernel door 420. The signal thread 400 also waits for signals, e.g., HUP, INT, STOP and TERM to gracefully shut down the system event daemon. In one embodiment of the present invention, if the HUP signal is presented to the signal thread 400, the SLMs 330 are unloaded and then reloaded.

The kernel door server thread 420 handles door up-calls from the kernel and copies event objects into a waiting buffer in the dispatch buffers 410. If the buffer 410 is unavailable, the kernel door server thread 420 returns a "not-available" signal. The kernel doors 420 typically are a mechanism by which the kernel 240 communicates with user level processes such as the system event daemon 340.

The dispatch thread 430 provides a mechanism through which the event buffers 410 are dispatched to each client (e.g., SLMs 330). These dispatches are accomplished by placing the buffers on a per-client event queue. Once an event buffer has been dispatched to all clients, a completion package is placed on the completion queue 450. The completion package contains the event identifier and the client reference count.

The event delivery thread 440 delivers the event data to each client subscribing to the event. Each client delivery thread extracts the next event buffer on its queue and calls the appropriate SLM 330 delivery routine to implement delivery of the event data. After a successful return from the SLM 330, the buffer is removed from the buffer queue 410 and an event completion is signaled to the event completion thread 450 for the particular client.

Once all clients have signaled completion of processing a particular event buffer 410, the event is released from the kernel by the event completion thread 450.

Figure 5:
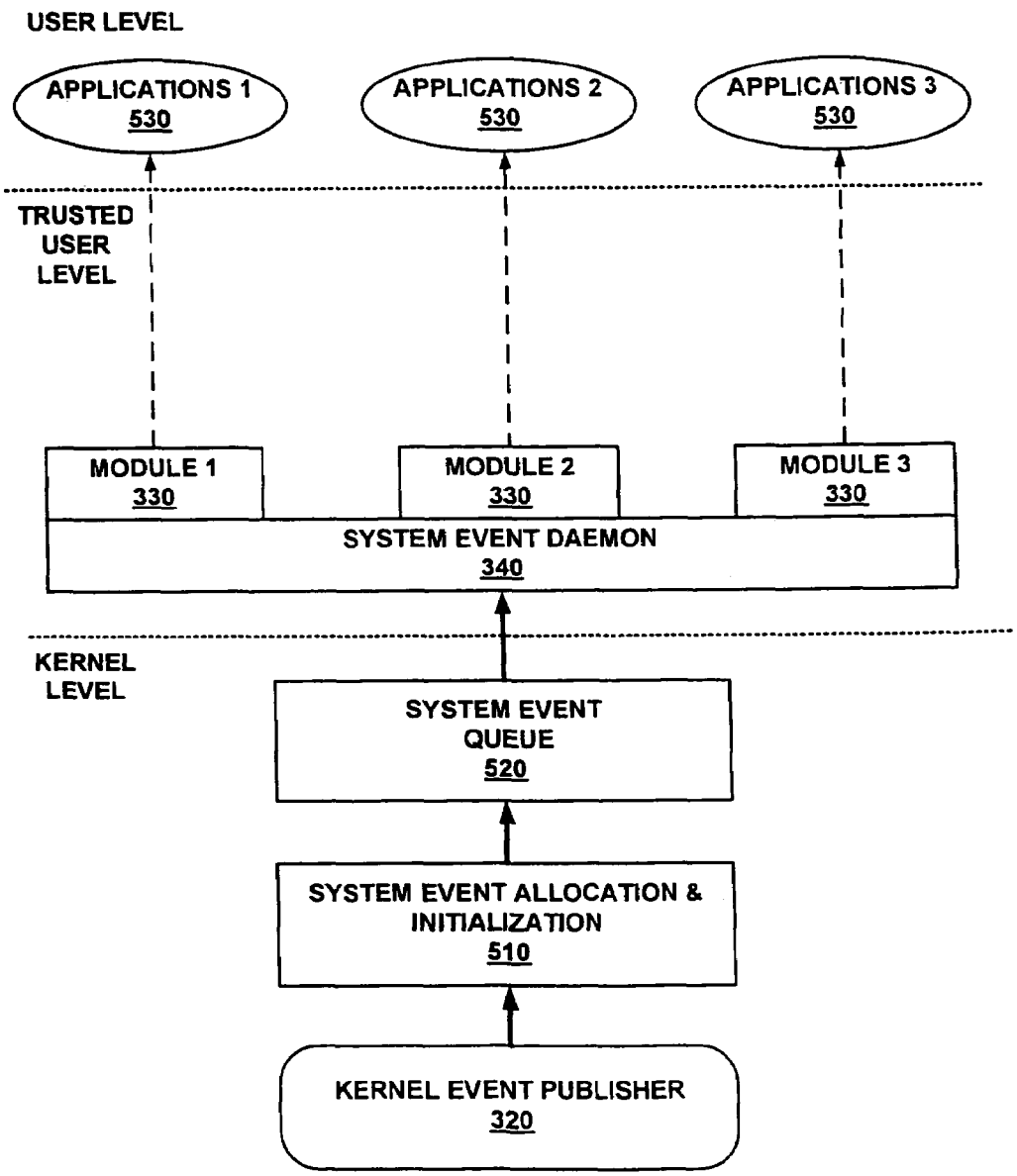
FIG. 5 is a block diagram of one embodiment of a system event flow of the kernel event monitoring framework of the present invention.

FIG. 5 is a data flow diagram of one embodiment 500 of the flow of data in the kernel system event framework 250 of the present invention. As shown in FIG. 5, events generated by the kernel 240 are published by the event publisher 320 to the subscribing applications 530. Each event is stored in an event buffer with associated payload (data). The event buffer is first allocated and initialized with event specific data provided by the kernel event publisher 320 and system specific identification (e.g., timestamp and sequencer). The event buffer is subsequently queued in the system event queue 520 for delivery to the system daemon 340. Each event buffer includes a set of header information. The header information is typically filled in by the system event framework 250, except the class and sub-class information.

Each system event buffer includes an event type, which comprises a class and a sub-class. An event class typically defines a set of related event conditions and the sub-class defines a particular condition within the class. The event buffers also include a unique event identifier that is unique to each event buffer in the system queue 520. In one embodiment of the present invention, the event identifier comprises a high resolution time stamp and a sequence number for each event. An exemplary event may be defined as follows:

event header
  class
  subclass
  timestamp
  sequencer
  vendor
  publisher self-describing event* class-specific data (e.g., name-value pairs).

where:
    class is the class of the event;
    sub-class is the sub-class of the event;
    vendor is the name of the vendor defining the event, for example the stock symbol of the vendor;
    publisher is the name of the application, driver or system module producing the event;
    timestamp is a high resolution time assigned at event buffer initialization time;
    sequencer is a monotonically increasing value assigned at initialization time.

Events from the system event queue 520 are extracted by the system daemon 340. The daemon 340 retrieves from the system event queue 520 the event buffers and through a dispatching thread places the buffers in each respective client's (applications 530) queue for delivery. Each of the applications 530 has an event buffer queue that stores events generated by the kernel 240.

Once delivery is made to each of the modules 1–3, the buffer is removed from the daemon's event completion thread. In one embodiment of the present invention, the event buffers are not removed from the daemon's event completion thread until each of modules 1–3 confirms receipt of the event. Confirmation of the receipt of events ensures the reliable delivery of events to the SLMs 330.

Figure 6:
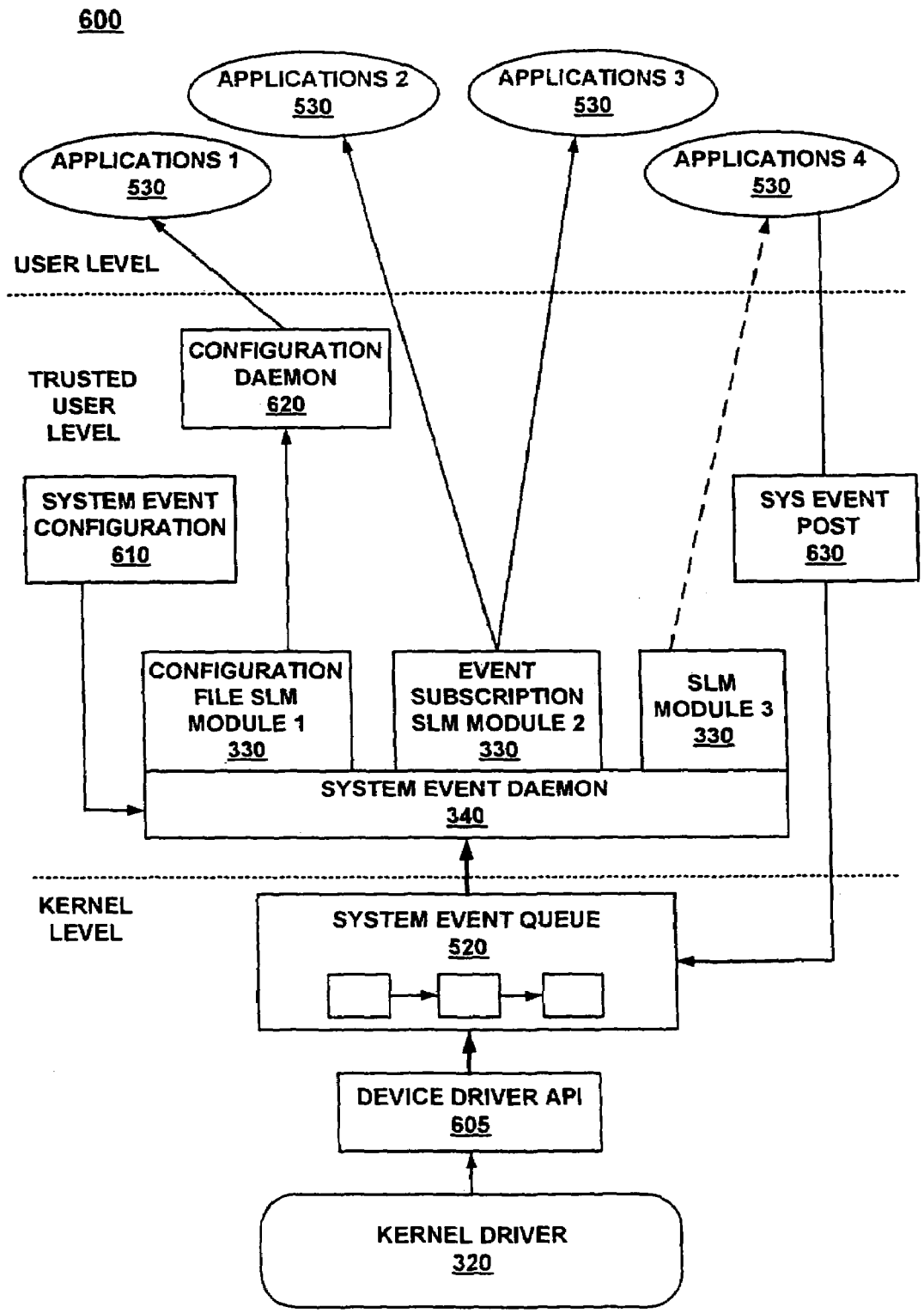
FIG. 6 is a block diagram of another embodiment of the system event flow of the kernel event monitoring framework of the present invention.

FIG. 6 is a data flow diagram of another embodiment 600 of event data flow in the present invention. In the embodiment disclosed in FIG. 6, a configuration file 610, a configuration file daemon 620 and a sys event post file 630 are added to the kernel system event framework 250. Based on the contents of the configuration file 610, an application is launched or invoked in response to a particular event.

The configuration file 610 provides class, sub-class, publisher and arbitrary attribute data that is used to indicate when an application should be launched. For example, if a user wishes to subscribe to event information for when a printer is either configured or de-configured to the system, the configuration file 610 is configured with the printer name, etc. The printer detect logic in the kernel 240 is invoked to configure the printer information in the kernel' sub-systems and generate an event (e.g., addition of a new printer) to all applications subscribing to be notified of the addition or deletion of printers from the kernel 240.

An exemplary configuration file of one embodiment of the present invention is as follows:
    "class; sub-class; vendor; publisher; reserved1; reserved2; path[arg1 arg2 . . . ]"

For example: with an event described by:

| class | event | vendor | pub | user | flag | service | [arg1arg2...] |
|---|---|---|---|---|---|---|---|
| ec_conf | esc_dc | QQQ | qd | - | - | /opt/QQQ/qd/bin/qdconfig-c | ${device_name} | where:
    class is the class of the event;
    sub-class is the sub-class of the event;
    vendor is the name of the vendor defining the event, for example the stock symbol of the vendor;
    publisher is the name of the application, driver or system module producing the event;
    timestamp is a high resolution time assigned at event buffer initialization time;
    sequencer is a monotonically increasing value assigned at initialization time.

The sys event post API 630 allows user level applications to generate events similar to events generated by the kernel 240. In the embodiment shown in FIG. 6, the system event framework 250 further includes a device driver system event interface 605. A wrapper function logic in the system event post event file 630 enables the addition of a device driver interface (DDI) that allows device drivers to call the SLMs 330 to place events. The DDI interface calls specific driver interface conventions and returns DDI specific errors in case of a failure. In one embodiment of the present invention, the DDI interface minimizes the number of interfaces a driver must use to publish system events.

Figure 7:
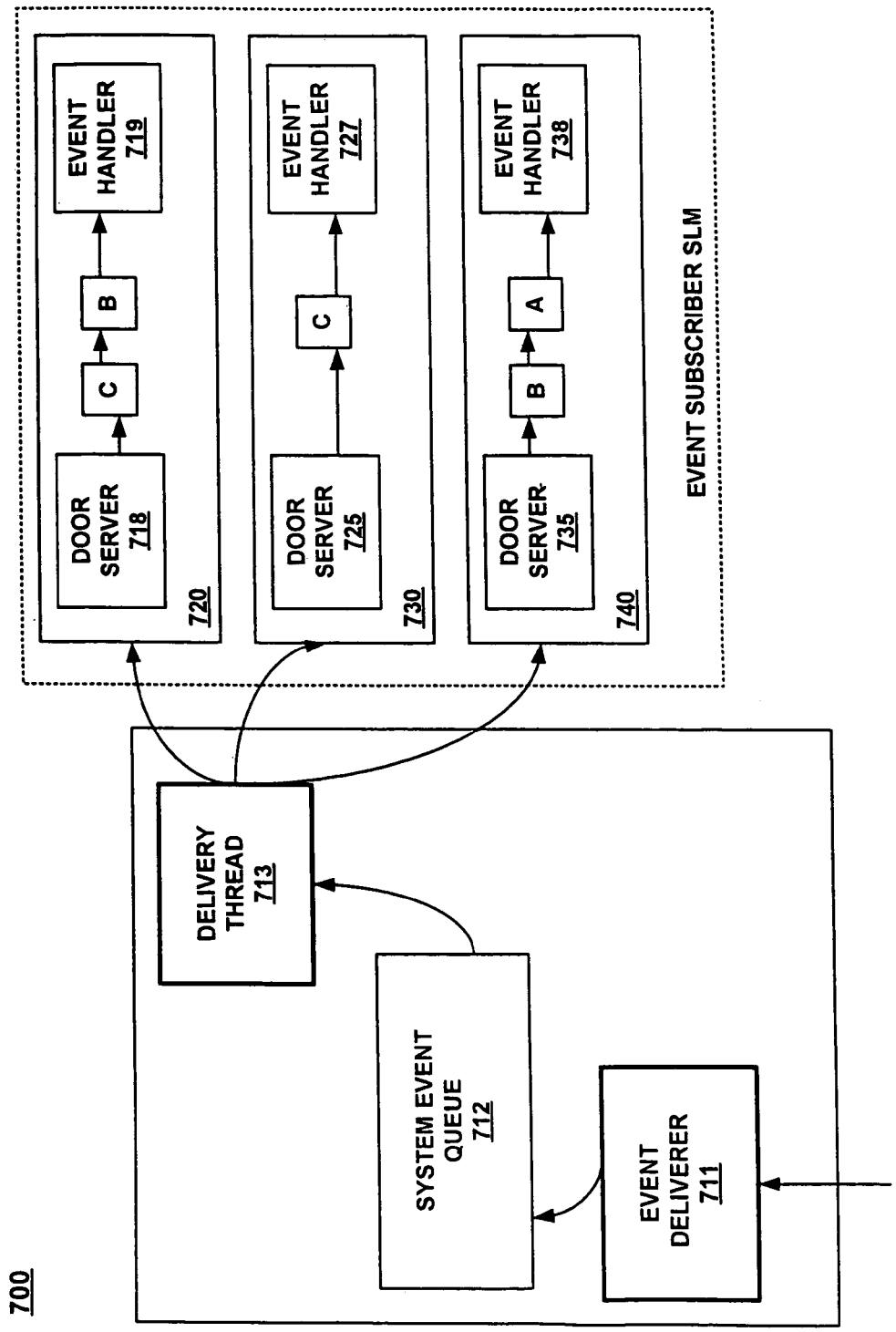
FIG. 7 is a block diagram of one embodiment a public registration interface for user applications to the kernel event monitoring framework of the present invention.

FIG. 7 is a block diagram illustration of one embodiment of system event subscription logic 700 of the present invention. The system event subscription logic 700 provides a mechanism for the system event framework to establish connections between the system event daemon and a subscribing application. A handle is created to hold the connection path and the subscribing application. The system event subscription logic 700 further provides the kernel system event framework 250 with a mechanism to free previously allocated system event handles generated by the system event daemon 340 after events have been delivered to the subscribing applications. The system event subscription logic 700 further includes a system event unsubscribe logic that allows the system event framework 250 to disable delivery of system event notifications to subsequent system events that occur in the kernel according to a system event type list. In one embodiment of the present invention, the system event type list may be used to subscribe to events of interest to the subscribing application.

The event subscription feature is implemented as a special purpose SLM 330. User applications may engage in event subscription in the present invention through library interface 310 that establishes and maintains event subscription connection paths between the event subscription SLM and the subscribing application. The system event daemon 340 opens the libraries and delivers event buffers to the SLMs 330 and the SLM 330 in turn delivers the event buffers to the user application. The event buffers are asynchronously delivered to the user application via, for example, call back routines in which system programs deliver the event buffers to the user applications.

In the example shown in FIG. 7, events from the system event daemon 340 are passed to the event dispatcher 711 and queued for delivery in the system event queue module 712. The queued events are then provided to the event delivery module 713 which delivers the events to the event subscriber SLM. The event subscriber SLM in-turn makes door calls to the door server 718, 725 and 735 for each respective subscriber application 720, 730 and 740 to make delivery of each respective system event buffer (A–C) to each respective application. Each of the event handles 719, 727 and 738 establishes a connection between the system event daemon 340 and the subscribing application. The handle holds the connection path e.g., file system name) and the calling applications' event delivery routine. After an event is delivered, the handles respectively close the connection between the system event daemon and the calling application and frees the system event daemon handles previously allocated.

Figure 8:
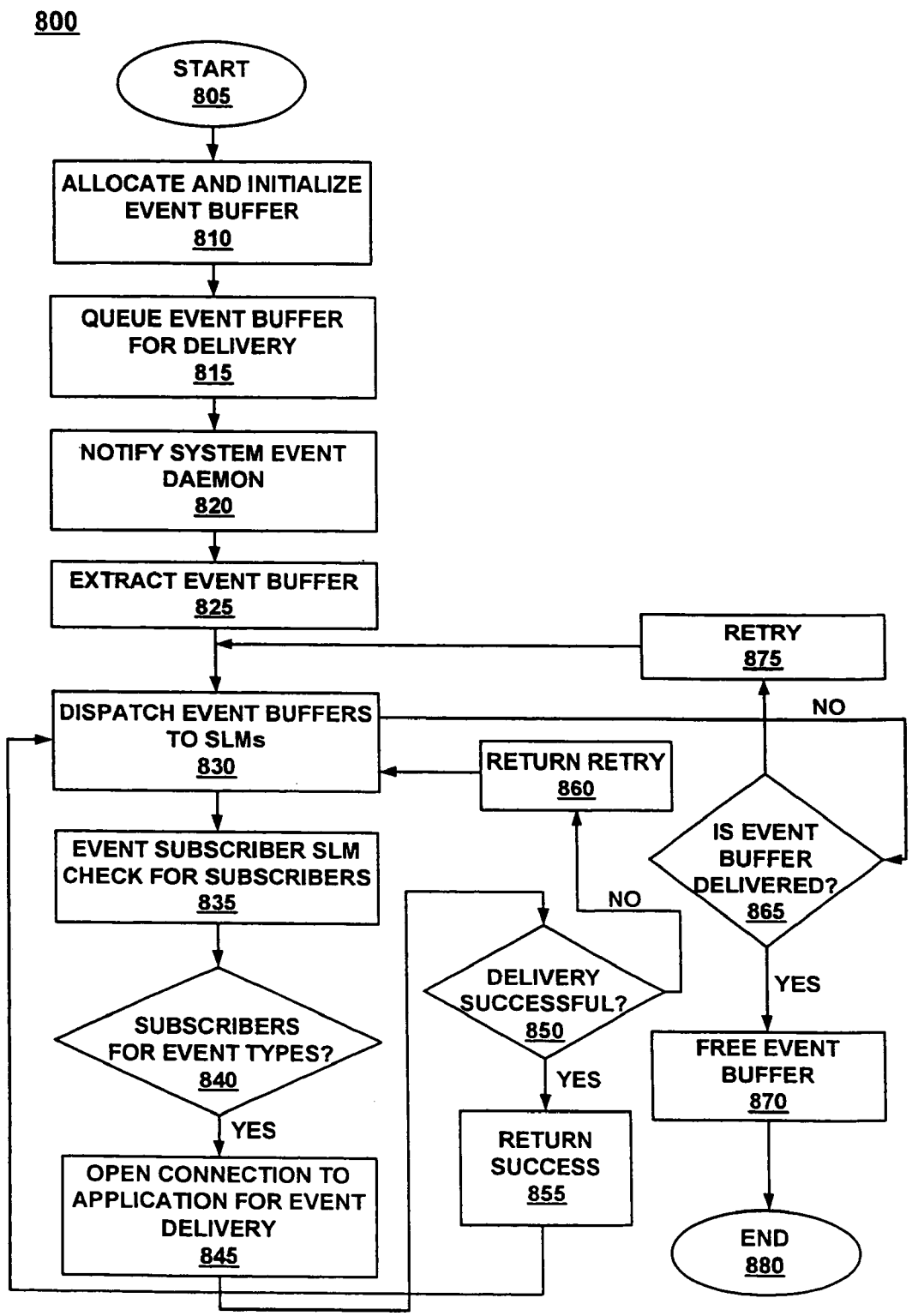
FIG. 8 is a flow diagram illustration of one embodiment of an event subscription and publication of the kernel event monitoring framework of the present invention.

FIG. 8 is an exemplary computer controlled flow diagram of one embodiment of event subscription and delivery of the present invention. As shown in FIG. 8, implementation of an event subscription and delivery is initiated by a computer system user application subscribing to the kernel system framework 250 event notification logic for particular events. At step 810, the kernel system framework 250 allocates and initializes event buffers for the events being subscribed. At step 820, the framework 250 queues the event buffers for delivery. After the event buffers have been queued, the framework 250 notifies the system event daemon 340 of the queued events.

At step 825, the queued event buffers are extracted and dispatched at step 830 to the corresponding SLMs 330. At step 835, the event subscription SLM 330 checks for subscribing users or applications to the queued events. At step 840, the subscribing SLM 330 determines whether the identified subscribers have subscribed to a particular event type.

If the identified subscribers have subscribed to the specific event type determined by the subscribing SLM 330, the framework 250 opens connection to the particular application for event delivery at step 845.

At step 850, the framework 250 checks to determine whether a queued event buffer has been successfully delivered to the subscribing application. If the event has been successfully delivered, the framework 250 returns success at step 855 to the dispatching SLM 330 and continues delivery of other events in the queue buffer. If an event is unsuccessfully delivered, a return retry is signaled to the dispatching SLM 300 at step 860.

At step 865, the framework 250 performs a second check to determine whether an event buffer has been delivered. If during this check the event buffer has been delivered, the event buffer is freed at step 870 and processing ends at step 880. If, on the other hand, the event buffer has not been delivered, the framework 250 performs a delivery retry at step 875, to re-deliver the event buffer.

In a typical operation of one embodiment of the KLFS 250, the event publisher 310 calls the system event allocation and initialization module 510. The system event allocation and initialization module 510 has the event data which includes the class, sub-class, publisher identifier and attribute data. The KLFS 250 then places the event data into a single buffer for each event. The system daemon 340 in communicating with the kernel 240 extracts the event buffers stored in the system event log 320 and dispatches the event data to the SLMs 330 which subsequently place the event buffers in each subscribing applications individual event buffers. For example, if there is a fault condition in the kernel 240 as a result of a device driver receiving many time-outs at its ports. The kernel 240 will call the system event log 320 to log the particular condition. The KLFS 250 will then compose the fault event class as, for example, "an ec_fault"; a sub-class will be defined as "time-outs" and the KLFS 250 will fill the unique identifier for the event and the event publisher will further publish the event in terms of the attribute data.

In this example, the attribute data will be defined as a set of name-pair value (e.g., time-out with an intrinsic value specifying the time-out limit). Applications subscribing to this event will extract the event data and notice the time-out limit (e.g., 3) and will be able to dynamically adjust processing to the specific device driver when the time-out is over.

Event Channel

In FIGS. 2–8, the system event framework is discussed in detail. In an embodiment of the present invention, this system event framework is extended by incorporating the event channel for event publication (e.g., by publishers) and subscription (e.g., subscribers) from the user level and kernel level of a computer system environment. In particular, the event channel provides numerous benefits. First, the event channel reduces the potential bottleneck at the system event daemon 340 (FIG. 5). Moreover, the event channel enables user level subscribers as well as kernel level subscribers since the system event framework focuses solely on user level subscribers. Additionally, the event channel provides the ability to create multiple event queues such as event queues for particular types of events (e.g., errors and faults) while the system event framework relies on a single system event queue 520 (FIG. 5).

Figure 9:
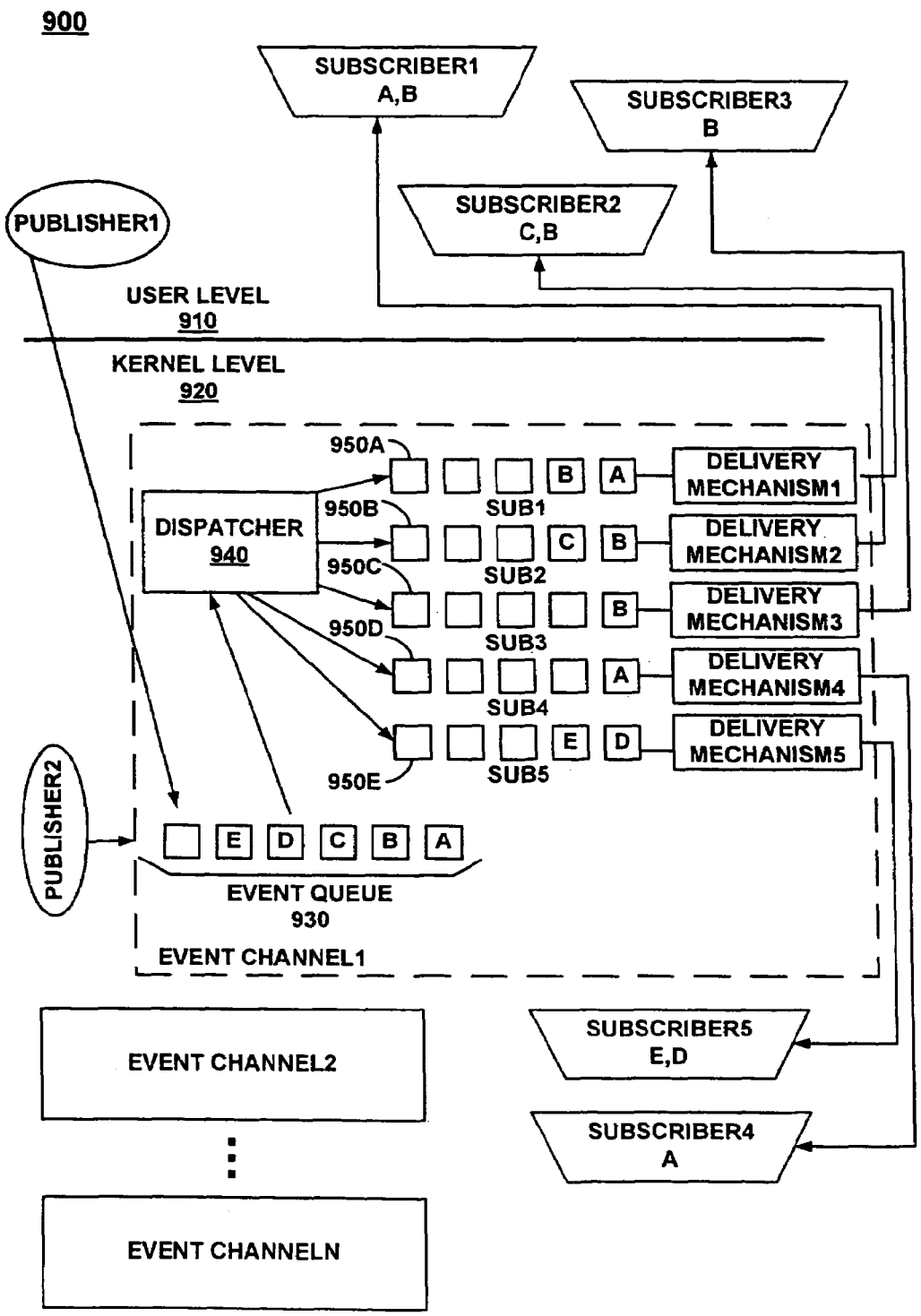
FIG. 9 illustrates a computer system environment in accordance with an embodiment of the present invention, showing event channels.

FIG. 9 illustrates a computer system environment 900 in accordance with an embodiment of the present invention, showing event channels. As depicted in FIG. 9, the computer system environment 900 includes a user level environment 910 and a kernel level environment 920. Typically, application programs operate in the user level environment 910. Moreover, kernel components operate in the kernel level environment 920.

As shown in FIG. 9, there is a plurality of event channels (e.g., event channel1, event channel2, and event channelN) operating in the kernel level environment 920. The number of event channels created depends on numerous factors (e.g., size of event channel, demand, available memory resources, processor power, etc.). In particular, the architecture of event channel1 is shown in detail. It should be understood that the architectures of event channel2 and event channelN are similar to the architecture of event channel1. Each event channel has a channel name that can be utilized by publishers and subscribers. In an embodiment, an event channel is created by a publisher or a subscriber by calling a bind API which returns a handle to the event channel.

Event channel1 has an event queue 930, a dispatcher 940, a plurality of subscriber-based queues 950A–950E, and a plurality of delivery mechanisms (e.g., delivery mechanism1–delivery mechanism5).

In practice, a publisher publishes the occurrence of an event by sending the event to the event channel1. In an embodiment, the publisher calls a publish API to publish the occurrence of an event. Typically, the event includes a plurality of information as described above. The publisher can be a user level publisher (e.g., publisher1) or a kernel level publisher (e.g., publisher2). Multiple publishers can exist in the user level environment 910 and in the kernel level environment 920. The publishers publishes the occurrence of user level events while the publisher2 publishes the occurrence of kernel level events. It should be understood that publisher1 can be an application program or any other object operating in the user level environment 910. Moreover, it should be understood that publisher2 can be a kernel component or any other object operating in the kernel level environment 920.

The event sent by the publisher (e.g., publisher1 or publisher2) to the event channel1 is placed in the event queue 930. Here, event A, event B, event C, event D, and event E have occurred and are in the event queue 930.

A subscriber subscribes to receive delivery of a particular event that has occurred by registering for event delivery with the event channel1. In an embodiment, the subscriber calls a subscribe API to subscribe to receive delivery of a particular event. There are numerous types of user level events and kernel level events. The subscriber can be a user level subscriber (e.g., subscriber1, subscriber2, and subscriber3) or a kernel level subscriber (e.g., subscriber4 and subscriber5). Multiple subscribers can exist in the user level environment 910 and in the kernel level environment 920. It should be understood that subscriber1, subscriber2, and subscribers can be an application program or any other object operating in the user level environment 910. Moreover, it should be understood that subscriber4 and subscriber5 can be a kernel component or any other object operating in the kernel level environment 920. Additionally, the subscriber can unsubscribe from an event channel.

Here, subscriber1 has registered with event channel1 to receive delivery of event A and event B. Subscriber2 has registered with event channel1 to receive delivery of event B and event C. Subscriber3 has registered with event channel1 to receive delivery of event B. Subscriber4 has registered with event channel1 to receive delivery of event A. Subscriber5 has registered with event channel1 to receive delivery of event D and event E.

Typically, the dispatcher 940 dispatches based on filtering criteria the events. The filtering is done prior to dispatching an event to a subscriber-based queue. This allows the deliver of those events for which a subscriber is interested in receiving. It should be understood that the dispatcher 940 includes a means to queue only those events for which a subscriber has subscribed and has explicit interest in receiving.

Once a subscriber has registered with the event channel1, a particular subscriber-based queue (e.g., 950A–950E) can be designated for the subscriber. Hence, each subscriber-based queue (e.g., 950A–950E) corresponds to a particular subscriber. For example, subscriber-based queue 950A corresponds to subscriber1. Subscriber-based queue 950B corresponds to subscriber2. Subscriber-based queue 950C corresponds to subscriber3. Subscriber-based queue 950D corresponds to subscriber4. Subscriber-based queue 950E corresponds to subscriber5.

The dispatcher 940 puts events into the subscriber-based queues 950A–950E according to the subscription information from the subscribers that represents the filtering criteria. That is, if a particular event is sent to the event queue 930, the dispatcher 940 puts that event in the subscriber-based queues 950A–950E of subscribers that have subscribed to receive delivery of the particular event. As shown in FIG. 9, subscriber-based queue 950A (for subscriber1) has event A and event B. Subscriber-based queue 950B (for subscriber2) has event B and event C. Subscriber-based queue 950C (for subscriber3) has event B. Subscriber-based queue 950D (for subscriber4) has event A. Subscriber-based queue 950E (for subscriber5) has event E and event D. In an embodiment, the dispatcher 940 is implemented as a dispatch thread.

Continuing with FIG. 9, each subscriber-based queue (e.g., 950A–950E) has a delivery mechanism (e.g., delivery mechanism1–delivery mechanism5). Each delivery mechanism (e.g., delivery mechanism1–delivery mechanism5) delivers the events in the subscriber-based queue to the corresponding subscriber in an asynchronous manner relative to the placing of the events in the event queue 930. This approach mitigates the negative influence of the subscribers among each other. In an embodiment, each delivery mechanism is implemented as a delivery thread to do the door upcalls to user level subscribers and the callbacks to kernel level subscribers. The delivery mechanism and confirmation of event delivery can be performed as described above with respect to the system event framework. Moreover, an event is not discarded from the subscriber-based queues 950A–950E until the subscribers have confirmed delivery of the event with the even channel, as described above with respect to the system event framework.

Figure 10:
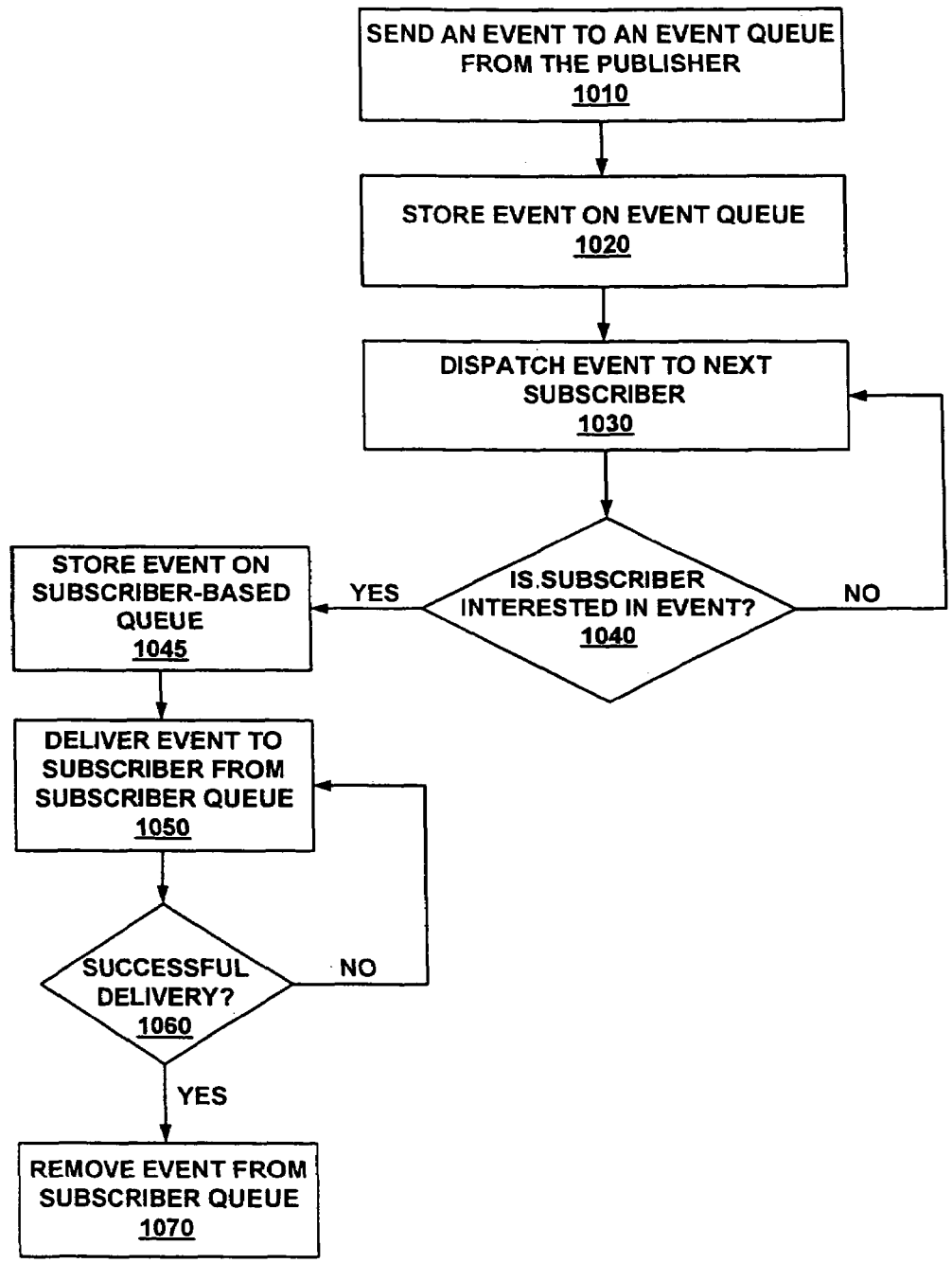
FIG. 10 illustrates a flow chart showing a method of managing an event from a publisher to a subscriber in accordance with an embodiment of the present invention.

FIG. 10 illustrates a flow chart showing a method 1000 of managing an event from a publisher to a subscriber in accordance with an embodiment of the present invention. It should be understood that the subscriber has registered with an event channel to receive delivery of the occurrence of an event.

At Step 1010, the event has occurred. The publisher sends the event to an event queue of the event channel.

Continuing, at Step 1020, the event is stored on the event queue of the event channel. Moreover, at Step 1030, the event is dispatched to the next subscriber. At step 1040, it is determined based on filtering criteria whether the subscriber is interested in the event, whereas the filtering criteria indicates which events each subscriber is interested in receiving. If the subscriber has not subscribed to receive the event, the method proceeds to Step 1030. If the subscriber has subscribed to receive the event, the method proceeds to Step 1045.

At Step 1045, the event is stored on the subscriber-based queue corresponding to the subscriber. Moreover, at Step 1050, the event is delivered to the subscriber from the subscriber-based queue in an asynchronous manner relative to the placing of the event in the event queue. At Step 1060, it is determined whether the delivery was successful. If the delivery is unsuccessful, the method proceeds to Step 1050 to retry the delivery. If the delivery is successful, the method proceeds to step 1070. At Step 1070, the event is removed from the subscriber-based queue.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system comprising:
   an event channel for delivering events to subscribers in the user level and the kernel level comprising
   an event queue for an event sent by a publisher,
   a plurality of subscriber-based queues each corresponding to a subscriber,
   wherein if said corresponding subscriber has subscribed to receive delivery of said event said subscriber-based queue includes said event,
   a dispatcher for dispatching based on filtering criteria said event to said subscriber-based queue if said corresponding subscriber has subscribed to receive delivery of said event, wherein said dispatcher filters said event based on filtering criteria prior to dispatching said event to said subscriber-based queue, and
   a delivery mechanism in the subscriber-based queue for delivering said event from said subscriber-based queue to said corresponding subscriber.

2. The system as recited in claim 1 wherein said publisher is a user level publisher.

3. The system as recited in claim 1 wherein said publisher is a kernel level publisher.

4. The system as recited in claim 1 wherein said subscriber is a user level subscriber.

5. The system as recited in claim 1 wherein said subscriber is a kernel level subscriber.

6. The system as recited in claim 1 wherein said event is a user level event.

7. The system as recited in claim 1 wherein said event is a kernel level event.

8. The system as recited in claim 1 wherein said delivery mechanism for delivering said event from said subscriber-based queue to said corresponding subscriber is performed asynchronously with respect to addition of an event to the event queue.

9. A computer system comprising:
   a user level environment;
   a kernel level environment; and
   a plurality of event channels operating in said kernel level environment to communicate with said user level environment each event channel comprising
      an event queue far an event sent by a publisher,
      a plurality of subscriber-based queues each corresponding to a subscriber,
   wherein if said corresponding subscriber has subscribed to receive delivery of said event said subscriber-based queue includes said event,
      a dispatcher for dispatching based on filtering criteria said event to said subscriber-based queue if said corresponding subscriber has subscribed to receive delivery of said event, wherein said dispatcher filters said event based on filtering criteria prior to dispatching said event to said subscriber-based queue, and
      a delivery mechanism in the subscriber-based queue for delivering said event from said subscriber-based queue to said corresponding subscriber.

10. The computer system as recited in claim 9 wherein said publisher is a user level publisher.

11. The computer system as recited in claim 9 wherein said publisher is a kernel level publisher.

12. The computer system as recited in claim 9 wherein said subscriber is a user level subscriber.

13. The computer system as recited in claim 9 wherein said subscriber is a kernel level subscriber.

14. The computer system as recited in claim 9 wherein said event is a user level event.

15. The computer system as recited in claim 9 wherein said event is a kernel level event.

16. The computer system as recited in claim 9 wherein said delivery mechanism for delivering said event from said subscriber-based queue to said corresponding subscriber is performed asynchronously with respect to addition of an event to the event queue.

17. A method of managing an event from a publisher to a subscriber, comprising:
   sending said event to an event queue of an event channel from said publisher;
   dispatching based on filtering criteria said event to a subscriber-based queue corresponding to said subscriber, wherein said subscriber has subscribed to receive delivery of said event and said event is filtered based on filtering criteria prior to dispatching said event to said subscriber-based queue; and
   delivering said event to said subscriber from said subscriber-based queue using a delivery mechanism in the subscriber-based queue;
   wherein the event channel is configured to perform the delivering of said event to subscribers in one of either the user level or the kernel level.

18. The method as recited in claim 17 wherein said publisher is a user level publisher.

19. The method as recited in claim 17 wherein said publisher is a kernel level publisher.

20. The method as recited in claim 17 wherein said subscriber is a user level subscriber.

21. The method as recited in claim 17 wherein said subscriber is a kernel level subscriber.

22. The method as recited in claim 17 wherein said event is a user level event.

23. The method as recited in claim 17 wherein said event is a kernel level event.

24. The method as recited in claim 17 wherein said delivering said event to said subscriber from said subscriber-based queue is performed asynchronously with respect to addition of an event to the event queue.

* * * * *